M. TIBBETTS.
MOTOR VEHICLE.
APPLICATION FILED JULY 9, 1915.
1,218,719. Patented Mar. 13, 1917.
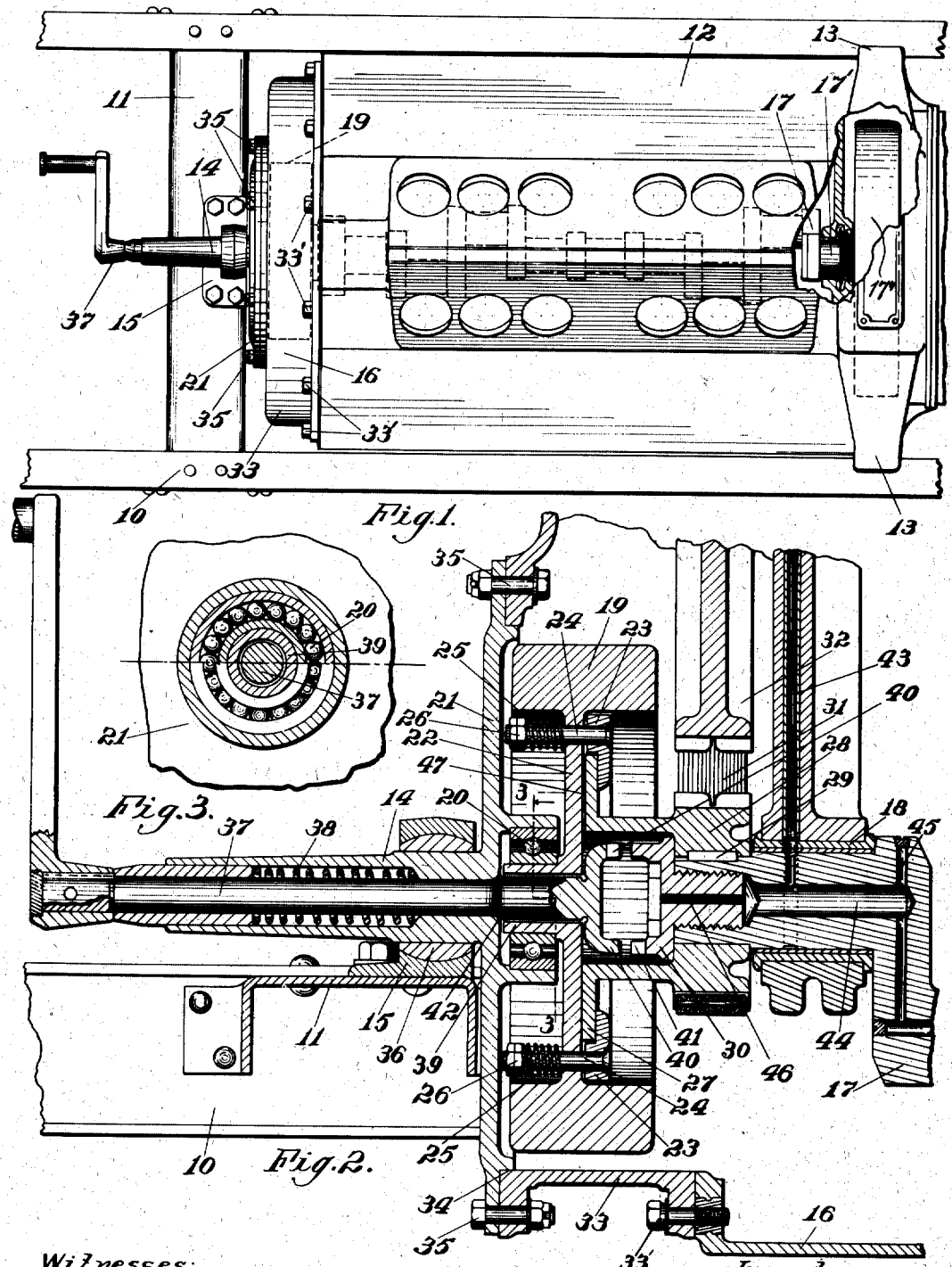

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,218,719.  Specification of Letters Patent.  Patented Mar. 13, 1917.

Application filed July 9, 1915. Serial No. 38,905.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles. It has particular reference to balancing and supporting the motor in the vehicle frame.

The invention comprises a novel combination of an inertia member connected to the motor crank shaft with the means for supporting the motor in a vehicle frame. A single form of the invention is shown in the accompanying drawings but it will be understood that this form is illustrative only, the invention being capable of embodiment in other forms, and such changes and modifications may be made as are desirable without departing from the scope of the invention.

A salient object of the invention is to provide a novel and efficient vehicle motor supporting means and vibration damper arrangement. Other objects will appear from the following description taken in connection with the drawings which form a part of this specification, and in which:

Figure 1 is a plan view of the front end of a motor vehicle embodying this invention;

Fig. 2 is an enlarged vertical sectional view through the front end of the motor and adjacent parts of the vehicle frame shown in Fig. 1; and Fig. 3 is a detail sectional view on the line 3—3 of Fig. 2.

In the drawings, 10 represents the side members and 11 a cross member of a motor vehicle frame, upon which the motor 12 is mounted. At one end the motor is supported on the frame at two points, the arms 13 resting directly upon the side members 10, and at the other end it is supported at a single point, preferably a central pivotal point, a trunnion 14 entering a bracket 15 secured to the middle of the cross member 11. Thus the motor is supported on the vehicle frame at three points and the front end of the frame 10 may weave slightly relative to the motor without in any way affecting the alinement of the motor bearings.

The motor shown herein is of the twelve cylinder V type and in Fig. 1 the cylinders have been removed for clearness of illustration. A part has also been broken away in Fig. 1 to expose the rear end of the crank shaft 17, its rear bearing 17' and the main flywheel 17'' which is arranged adjacent the rear supports 13. In Fig. 2 the forward portion of the crank case part 16 of the motor is illustrated, and the crank shaft 17 is shown as having its forward end supported in a bearing 18 in the crank case. In motors of this type in which a comparatively long crank shaft is employed it frequently occurs that a periodic torsional vibration is set up in the crank shaft and transferred to the motor frame through the medium of the reciprocating parts, and for the purpose of damping out this vibration an inertia member is sometimes connected frictionally or otherwise to the front end of the crank shaft. In three points supported motors such as the one herein illustrated, torsional vibration may become more prominent due to the fact that the front end of the motor is supported at a pivotal point, the pivot or trunnion sometimes being in line with the crank shaft. The present invention contemplates effectively lessening or damping out these vibrations by the use of a rotatable inertia member mounted coaxial with the motor trunnion and preferably coaxial also with the motor crank shaft and yieldingly connected to the latter. As shown, an inertia member 19 in the form of a small flywheel, is mounted in annular ball bearings 20 in a bracket 21 which has the trunnion 14 formed as a forwardly extending integral part thereof. The web 22 of the flywheel 19 forms one of the plates of a three plate friction clutch connection between the flywheel 19 and the crank shaft 17 for yieldingly connecting the flywheel with the crank shaft. An opposing plate 23 rotates with the flywheel 19 being connected thereto by studs 24, and springs 25 surround the studs and together with the adjusting nuts 26, tend to press the plate 23 toward the plate 22. Arranged between these two plates is a third plate 27 which is formed as an integral extension on a sprocket or gear 28 keyed to the forward end of the crank shaft 17 as by a key 29. A nut 30 secures the gear 28 in place. The gear or sprocket 28 is arranged to drive the cam shaft of the motor through the chain 31 and the gear 32, the latter being on the cam shaft which is not shown.

From the above description it will be seen that the inertia member or flywheel 19 is mounted coaxial with both the trunnion 14 and and the crank shaft 17 and that it is yieldingly connected to the latter through a friction coupling whereby it will rotate with the crank shaft without slip except when vibration is set up sufficient to overcome the frictional connection. There will then be a slight slip between the crank shaft and the flywheel which will tend to damp out the vibration.

It will be seen that the crank case 16 has a forward extension or housing 33 detachably secured thereto by bolts 33', which housing surrounds the gears 28 and 32 and the flywheel 19 and is provided with a front opening 34 large enough to admit the flywheel 19 to the housing. This opening 34 is closed by a detachable bracket or cover which constitutes the part 21 hereinabove referred to, and this is secured in place by the bolts 35. The forward extension or trunnion 14 of the bracket 21 is surrounded by a bushing 36 of outer spherical form and inclosed by the bracket 15 above described. The bushing 36 may be formed in sections or otherwise arranged for assembly within the bracket 15.

The trunnion 14 is drilled out and arranged to support a starting crank 37, a spring 38 for retracting the starting crank being also housed within the trunnion 14. The inner end of the shaft of the starting crank 37 extends through the hub 39 of the flywheel 19 but out of contact therewith, and is provided with clutch teeth 40 which are adapted to engage similar teeth 41 formed on the nut 30, which is screwed tightly into the forward end of the crank shaft 17. Thus the starting crank may be manually pushed inwardly so that the teeth 40 and 41 engage and the crank shaft may then be turned for the purpose of starting the motor. In the retracted position of the starting crank a shoulder 42 adjacent its inner end abuts against the wall of the cover 21 and effectively closes the drilled out portion of the trunnion 14 so that no oil can escape from the crank case at that point.

For the purpose of lubricating the various moving parts of the motor herein described, a suitable passage 43 is formed in the part of the crank case 16 which supports the bearing 18, and the crank shaft 17 is drilled out as shown particularly at 44 and 45 so that oil is fed not only to the surface of the bearing 18 but also to the interior of the crank shaft. The nut 30 which forms the front end of the crank shaft has a passage 46 drilled therein so that oil may pass from the drilled out part 44 of the crank shaft and into the interior of the damper or of the inertia member 19. Some of this oil then passes radially outward between the plates 22 and 27, being facilitated by radial grooves 47 formed in the surface of one of these plates, and some of it passes through the hub of the flywheel 19 and into the bearing 20. From there it escapes into the forward end of the crank case and drains down into the bottom thereof. There may be a continual circulation of the oil in the motor, it being supplied to the passage 43 under pressure by a pump (not shown) which takes the oil from the bottom of the crank case 16.

Having thus described my invention, what I claim and desire to secure by Letters Patnet is:—

1. In a hydrocarbon motor the combination with a crank case having a trunnion member at one end and by which it is supported at that end, and a crank shaft mounted in bearings in the crank case, of an inertia member supported by said trunnion member, and a yielding connection between said inertia member and said crank shaft.

2. In a hydrocarbon motor the combination with a crank case having a trunnion member at one end and by which it is supported at that end, and a crank shaft mounted in bearings in the crank case, of an inertia member supported by said trunnion member and coaxial with its trunnion, and a yielding connection between said inertia member and said crank shaft.

3. In a hydrocarbon motor, the combination with a crank case having a trunnion member at one end and by which it is supported at that end, and a crank shaft mounted in bearings in the crank case, of a vibration damper for said crank shaft supported by said trunnion member and coaxial with the trunnion thereof.

4. In a hydrocarbon motor the combination with a crank shaft, of a vibration damper connected to one end of said crank shaft, and a starting crank adapted for connection to said crank shaft within said damper.

5. In a hydrocarbon motor the combination with a crank shaft, of a vibration damper connected to one end of said crank shaft, and a starting crank extending into and through said damper and adapted to connect with said crank shaft.

6. In a hydrocarbon motor, in combination, a crank shaft, a vibration damper connected thereto, and a trunnion support for the motor, all axially alined.

7. In a hydrocarbon motor, in combination, a crank shaft, a vibration damper connected thereto, a trunnion support for the motor, and a starting crank shaft, all axially alined.

8. In a hydrocarbon motor, in combination, a crank case having an opening at one end, a crank shaft therein, a vibration damper adapted to be inserted through said opening and connected to the crank shaft, and a cover for said opening.

9. In a hydrocarbon motor, in combination, a crank case having an opening at one end, a crank shaft therein, a cover for said opening, a vibration damper supported by said cover, and means connecting said damper to the crank shaft.

10. In a hydrocarbon motor, in combination, a crank case having an opening at one end, a crank shaft therein, a cover for said opening, and a vibration damper for the crank shaft supported by said cover.

11. In a hydrocarbon motor, in combination, a crank case having an opening at one end, a crank shaft therein, a cover for said opening, a vibration damper for the crank shaft supported by said cover, and a starting crank also supported by said cover and adapted for connection to the crank shaft.

12. In a motor vehicle, in combination, a vehicle frame, a motor having a crank shaft, means for supporting the motor on the frame including a trunnion, an inertia member mounted substantially coaxial with said trunnion, and a yielding connection between the inertia member and the motor crank shaft.

13. In a motor vehicle, in combination, a vehicle frame, a motor having a crank shaft, means for supporting the motor on the frame including a trunnion coaxial with said crank shaft, an inertia member mounted substantially coaxial with said trunnion, and a yielding connection between said inertia member and the motor crank shaft.

14. In a motor vehicle, in combination, a vehicle frame, a motor having a crank shaft, means for supporting the motor on the frame including a trunnion, an inertia member, and a yielding connection between said inertia member and the motor crank shaft, the axes of said crank shaft, trunnion and inertia member being alined.

15. In a motor vehicle, in combination, a vehicle frame, a motor having a crank shaft, means for supporting the motor on the frame at three points including a trunnion at one end of the motor, a rotatable inertia member mounted at the trunnioned end of the motor, and a yielding connection between the inertia member and the motor crank shaft.

16. In a motor vehicle, in combination, a vehicle frame, a motor having a crank shaft, means for supporting the motor on the frame at three points including a trunnion at one end of the motor, a rotatable inertia member mounted at the trunnioned end of the motor, and coaxial with the trunnion, and a yielding connection between the inertia member and the motor crank shaft.

17. In a motor vehicle, in combination, a vehicle frame, a motor having a crank shaft, means for supporting the motor on the frame at three points including a trunnion at one end of the motor, a rotatable inertia member mounted at the trunnioned end of the motor, a yielding connection between the inertia member and the motor crank shaft, and a starting crank adapted for connection to said crank shaft and arranged coaxial with said trunnion and said inertia member.

18. In a motor vehicle, in combination, a vehicle frame, a motor having a crank shaft, means for supporting the motor on the frame at three points including a trunnion at one end of the motor, a rotatable inertia member mounted at the trunnioned end of the motor, a yielding connection between the inertia member and the motor crank shaft, and a starting crank adapted for connection to said crank shaft and extending through said trunnion and said inertia member.

19. In a motor vehicle, in combination, a vehicle frame, a motor having a crank shaft, means for supporting the motor on the frame at three points including a trunnion at one end of the motor, a rotatable inertia member mounted at the trunnioned end of the motor, a yielding connection between the inertia member and the motor crank shaft, and a starting crank adapted for connection to said crank shaft and extending through said inertia member.

20. In a motor vehicle, in combination, a vehicle frame, a motor having a crank shaft, means for supporting the motor on the frame at three points including a trunnion at one end of the motor, a rotatable inertia member mounted at the trunnioned end of the motor, a yielding connection between the inertia member and the motor crank shaft, and a starting crank adapted for connection to said crank shaft and extending through said inertia member but out of contact therewith.

21. In a motor vehicle, in combination, a vehicle frame, a multi-cylinder motor having a comparatively long crank shaft with a flywheel at its rear end, means for supporting the motor on the frame at two points adjacent the flywheel end of the crank shaft and a single point at the front end in advance of the front end of the crank shaft, a rotatable inertia member mounted immediately in the rear of said single point of the motor supporting means, and a yielding connection between the inertia member and the motor crank shaft.

22. In a motor vehicle, in combination, a vehicle frame, a multi-cylinder motor having a comparatively long crank shaft with a flywheel at its rear end, means for supporting the motor on the frame at two points adjacent the flywheel end of the crank shaft and a single point at the front end in advance of the front end of the crank shaft, a rotatable inertia member mounted adjacent to and coaxial with said single supporting point, and a yielding connection between the inertia member and the motor crank shaft.

23. In a motor vehicle, in combination, a vehicle frame, a multi-cylinder motor having a comparatively long crank shaft with a flywheel at its rear end, means for supporting the motor on the frame at two points adjacent the flywheel end of the crank shaft and a single point at the front end in advance of the front end of the crank shaft, a rotatable inertia member mounted between the front end of the crank shaft and said single supporting point, and a yielding connection between the inertia member and the motor crank shaft.

24. In a motor vehicle, in combination, a vehicle frame, a multi-cylinder motor having a comparatively long crank shaft with a flywheel at its rear end, means for supporting the motor on the frame at two points adjacent the flywheel end of the crank shaft and a single point at the front end in advance of the front end of the crank shaft, a rotatable inertia member supported in bearings on the motor crank case coaxial with said single supporting point, and a yielding connection between the inertia member and the motor crank shaft.

25. In a hydrocarbon motor, the combination with the crank case and crank shaft therein, of a vibration damper frictionally connected to the crank shaft, and means for feeding oil through the crank shaft to said damper.

26. In a hydrocarbon motor, the combination with the crank case and crank shaft therein, of an inertia member having a suitable bearing, a frictional connection between said member and the crank shaft, and means for feeding oil to said bearing and to the friction surfaces of said connection.

27. In a hydrocarbon motor, the combination with the crank case, of a crank shaft having a bearing therein, a vibration damper connected to the crank shaft, and means for feeding oil to said bearing and from said bearing to said damper.

28. In a hydrocarbon motor, the combination with the crank case, of a hollow crank shaft in said crank case, a vibration damper connected to the crank shaft, means for feeding oil to the interior of said crank shaft, and means for leading the oil from the crank shaft to said damper.

In testimony whereof I affix my signature in the presence of two witnesses.

MILTON TIBBETTS.

Witnesses:
A. K. SPEER,
CLAIR S. COTE.